(12) United States Patent
Mozes (10) Patent No.: US 6,732,085 B1
(45) Date of Patent: May 4, 2004

(54) METHOD AND SYSTEM FOR SAMPLE SIZE DETERMINATION FOR DATABASE OPTIMIZERS

(75) Inventor: Ari W. Mozes, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 111 days.

(21) Appl. No.: 09/872,565

(22) Filed: May 31, 2001

(51) Int. Cl.[7] ................................................. G06F 17/30
(52) U.S. Cl. ................................................ 707/2; 707/3
(58) Field of Search ........................ 707/1, 2, 3, 4, 707/5, 6, 7, 8, 9, 10, 101, 102, 104.1, 104

(56) References Cited

U.S. PATENT DOCUMENTS

| | | | |
|---|---|---|---|
| 6,263,345 B1 * | 7/2001 | Farrar et al. | 707/104.1 |
| 6,272,487 B1 * | 8/2001 | Beavin et al. | 707/2 |
| 6,278,989 B1 * | 8/2001 | Chaudhuri et al. | 707/2 |
| 6,353,826 B1 | 3/2002 | Seputis | |
| 6,438,552 B1 * | 8/2002 | Tate | 707/10 |
| 6,460,045 B1 * | 10/2002 | Aboulnaga et al. | 707/102 |
| 6,529,901 B1 | 3/2003 | Chaudhuri et al. | 707/3 |

OTHER PUBLICATIONS

IBM: "Table reorganization" (1991).*

* cited by examiner

*Primary Examiner*—Diane D. Mizrahi
*Assistant Examiner*—Yicun Wu
(74) *Attorney, Agent, or Firm*—Bingham McCutchen LLP (57) ABSTRACT

A system and method for determining an adequate sample size for statistics collection is disclosed. A mechanism for automatically determining an adequate sample size for both statistics and histograms is provided. The sample size determination is accomplished via an iterative approach where the process starts with a small sample, and for each attribute which may need more data, the sample size is increased while restricting the information collected to only those attributes that require the larger sample.

70 Claims, 6 Drawing Sheets

METHOD AND SYSTEM FOR SAMPLE SIZE DETERMINATION FOR DATABASE OPTIMIZERS

COPYRIGHT NOTICE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND AND SUMMARY

The present invention relates to the field of computer systems. More particularly, the invention relates to a method and system for database optimization.

A "query" is a statement or collection of statements that is used to access a database. Specialized query languages, such as the structured query language ("SQL") are often used to interrogate and access a database. Many types of queries include at least the following. First, the identity of the database object(s) being accessed to execute the query (e.g., one or more named database tables). If the query accesses two or more database objects, what is the link between the objects (e.g., a join condition or column). The typical query also defines selection criteria, which is often referred to as a matching condition, filter, or predicate. Lastly, a query may define which fields in the database object are to be displayed or printed in the result.

Optimization is the process of choosing an efficient way to execute a query statement. Many different ways are often available to execute a query, e.g., by varying the order or procedure in which database objects and indexes are accessed to execute the query. The exact execution plan or access path that is employed to execute the query can greatly affect how quickly or efficiently the query statement executes.

Cost-based optimization is an approach in which the execution plan is selected by considering available access paths to determine the lowest cost approach to executing the query. In one approach, cost-based optimization consists of the following steps: (1) generating a set of potential execution plans for the database statement to be executed; (2) estimating the cost for each execution plan; and (3) comparing the costs of the execution plans to identify the execution plan having the lowest cost. Conceptually, the term "cost" relates to the amount of a given resource or set of resources needed to process an execution plan. Examples of such resources include I/O, CPU time, and memory. Various measures may be used to identify the execution plan having the lowest cost. For example, the cost-based approach may be used to identify the execution plan providing either the best throughput or the best response time.

Many database optimizers use statistics to calculate the "selectivity" of predicates and to estimate the cost of performing database operations. Statistics quantify characteristics of database and schema objects, such as the data distribution and storage characteristics of tables, columns, indexes, and partitions. Selectivity refers to the proportion or fraction of a database object corresponding to a query predicate. An optimizer uses the selectivity of a predicate to estimate the cost of a particular access method and to determine optimal join order.

Statistics should be gathered on a regular basis to provide the optimizer with needed information about schema objects. Significant costs may be incurred to collect and maintain statistics for database objects. To reduce this collection cost and improve performance, many database systems use data sampling to reduce the amount of data that must be collected to provide statistics used by the optimizer. With data sampling, only a portion of the rows within a database table is accessed to generate a set of statistics for the entire table or column. The results of the data sampling is thereafter scaled upward to extrapolate the statistics values for the entire population. However, different data distributions may require different sample sizes in order to obtain accurate statistics. If a too-small sample size is selected, then the statistics may be inaccurate, which could lead to sub-optimal execution plans and poor query performance. If a too-large sample size is selected, then resources are wasted to collect more data than is needed to provide accurate statistics. Consequently, it is desirable to use only the minimal sample size needed for accurate statistics collection.

In addition to statistics, optimizers often use data value histograms to select an optimal execution plan. A data value histogram is a structure that provides estimates of the distribution of data values in a database object. A histogram partitions the data object values in a set of individual "buckets", so that all values corresponding to a given range fall within the same histogram bucket. The histogram provides information that is helpful in determining the selectivity of a predicate that appears in a query.

Figure 1A:
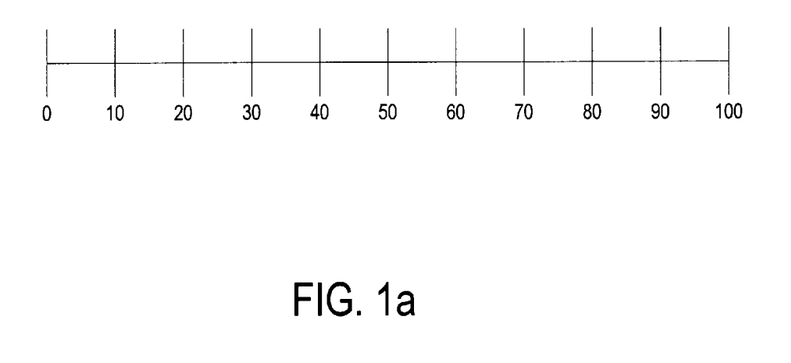
FIGS. 1*a* and 1*b* show example histograms.

In a height-balanced histogram, each bucket of the histogram corresponds to an equal number of rows in a table. The boundaries of the buckets shrink or grow so that all buckets maintain the same number of entries. The useful information provided by the histogram is the range of values that corresponds to each bucket, e.g., the endpoints for each bucket of the histogram. Consider a column C with values between 1 and 100 in which the column data is uniformly distributed. FIG. 1a shows a height-balanced histogram plotted for this column having ten buckets. The number of rows in each bucket of the histogram is one-tenth the total number of rows in the table. Since the data values are evenly distributed, the endpoints of the buckets are also evenly spaced.

Figure 1B:
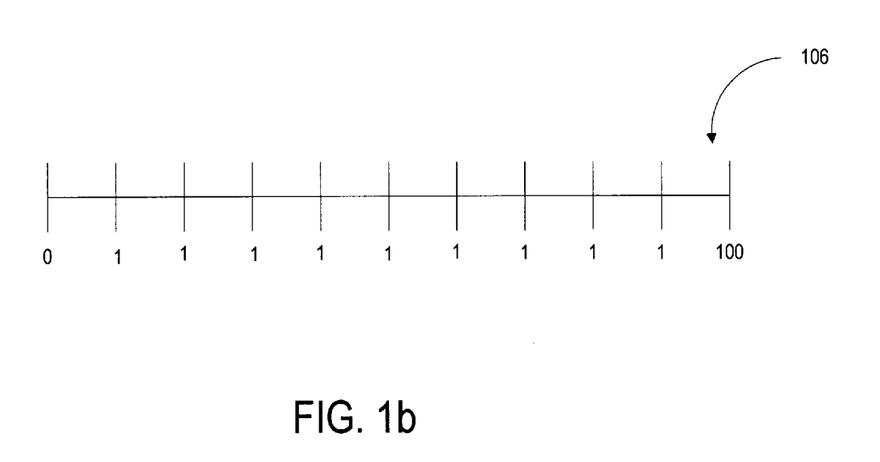

Now consider a second column having 100 rows for which column data values are not evenly spaced, in which ninety rows contain the value "1" and the other ten rows contain a column value between 2 and 100. FIG. 1b shows this column plotted in a height balanced histogram of ten buckets. Since ninety percent of the rows have the value "1", nine of the ten buckets in the histogram of FIG. 1b also correspond to the value "1". Thus, it can be seen that nine of the ten buckets in the histogram of FIG. 1b have endpoints that end in the number "1". The last bucket 106 corresponds to the ten rows in the column having data values between "2" and "100". In operation, such a histogram provides an optimizer with instant knowledge of the selectivity of particular values of a column. This selectivity information can be used, for example, to determine whether either a full table scan or an index access provides the most efficient path to satisfying a query against the database table corresponding to the histogram.

Other types of histograms also exist. For example, another histogram used by optimizers is the width-balanced histogram, in which column data is divided into a number of fixed, equal-width ranges and the histogram is organized to count the number of values falling within each range.

A histogram may not always provide an appreciable benefit. For example, a histogram may not be useful for a data set having uniform data distribution, since it can be assumed that all data within that set are equally distributed and therefore the histogram will not provide any additional useful information. If a histogram is desired, a significant amount of resources may be needed to collect, maintain, and use histograms. Therefore, it makes sense to only create, store, and/or use a histogram when such a histogram provides benefits greater than the expense of the histogram. However, conventional database systems typically rely upon the skill and knowledge of individual database administrators to manually decide whether histograms should or should not be collected for columns in the database. While guidelines may be provided to assist this decision-making, this manual process by administrators often leads to inconsistent and erroneous decisions resulting in the collection and storage of unneeded histograms, or the failure to collect histograms that could provide more efficient query processing.

The present invention provides a method and system for determining when to collect histograms. In an embodiment, the invention provides a mechanism for automatically deciding when to collect histograms upon request from the user. This decision is based on the columns the user is interested in, the role these columns play in the queries as submitted to the system, and the underlying distribution for these columns, e.g., as seen in a random sample. The user specifies which columns are of interest, and the database is configured to collect column usage information that describes how each column is being used in the workload. This column usage information could be stored in memory and periodically flushed to disk. Given a set of potential columns, the distribution of those columns is viewed in combination with the usage information to determine which columns should have histograms.

The invention also provides a system and method for determining an adequate sample size for statistics collection. In one embodiment, the invention provides a mechanism for automatically determining an adequate sample size for both statistics and histograms. This is accomplished via an iterative approach where the process starts with a small sample, and for each attribute which may need more data, the sample size is increased while restricting the information collected to only those attributes that require the larger sample.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The invention is described with reference to specific embodiments. It will, however, be evident that various modifications and changes may be made thereto without departing from the broader spirit and scope of the invention. The reader is to understand that the specific ordering and combination of process actions shown in the process flow diagrams and system components in component diagrams described herein are merely illustrative, and the invention can be performed using different, additional, or different combinations/ordering of process actions and components. For example, the invention is particularly illustrated herein with reference to specific database objects such as tables, columns, and rows, but it is noted that the inventive principles are equally applicable to other types of database objects. The specification and drawings are, accordingly, to be regarded in an illustrative rather than restrictive sense.

Figure 2:
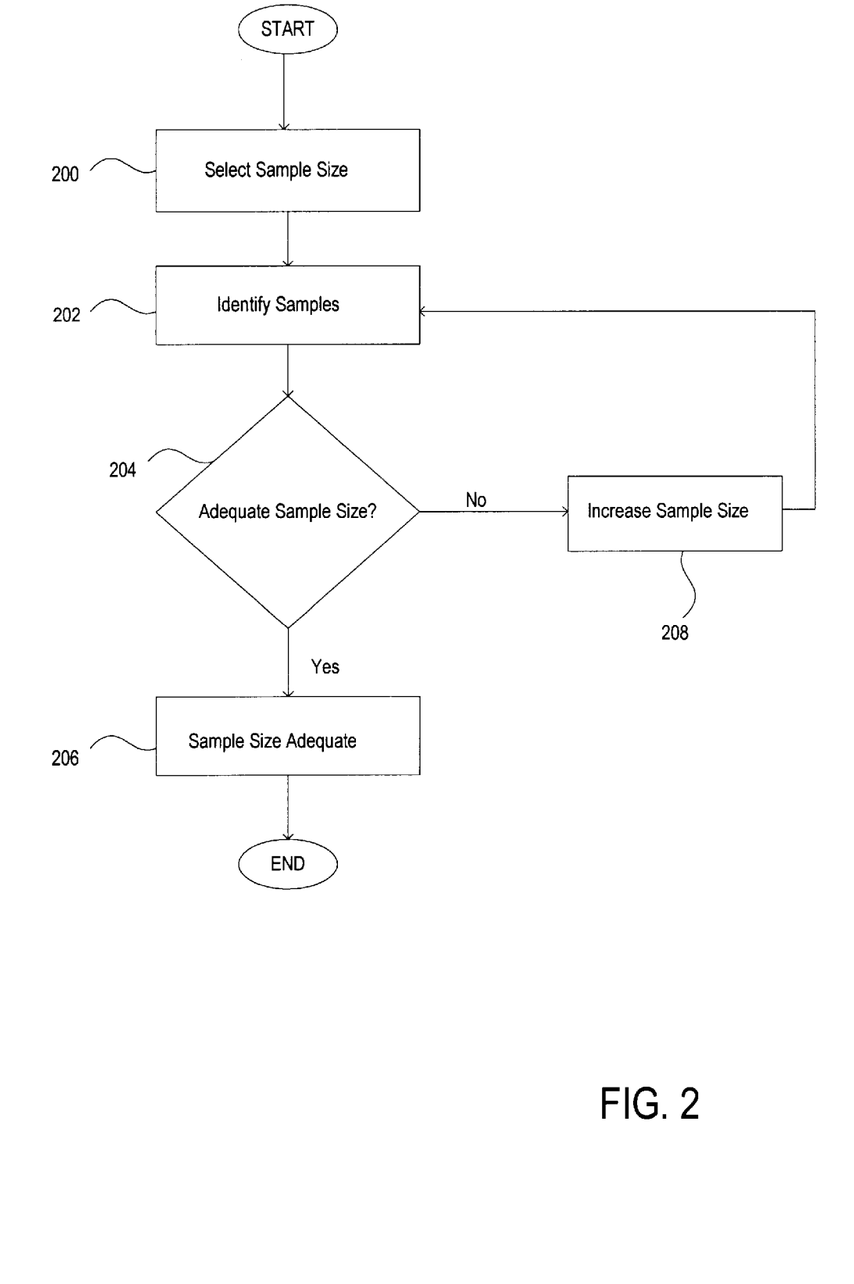
FIG. 2 shows a flowchart of a process for determining sample size for statistics collection according to an embodiment of the invention.

FIG. 2 shows a flowchart of a process for determining sample sizes for statistics collection, according to an embodiment of the invention. At step 200, an initial sample size is selected for statistics collection. In an embodiment, the selected sample size could be expressed as a percentage of the rows in a table. Other measures could be used to express sample size, such as an exact number of rows for the table.

At step 202, rows in the table are identified based upon the initially selected sample size. In an embodiment, this is accomplished by attempting to select the number of rows in the table corresponding to the percentage value used to express the initially selected sample size. For example, consider if the initially selected sample size is 20% and the number of rows in the table is 1000. For this example, the expected number of rows to be identified in step 202 is (1000)*(0.20)=200 rows. One way to achieve this is to provide a function (e.g., a "sample( )" function) that chooses rows from the table based upon the selected percentage value, in which each row is individually faced with a given percentage chance of being selected. If the sampling percentage is 20%, then each row in the column individually faces a 20% chance of being selected. In this manner, over the entire table, it is likely that approximately 20% of the rows in the table will be selected. The exact rows to be selected will be subject to a certain amount of randomization, and it is possible that the exact number of rows actually selected will be greater or smaller than 20%. The statistics gathered based upon this sampling can later be used to extrapolate statistics for the entire table.

At step 204, a determination is made regarding whether the number of sample rows identified in step 202 is adequate. In an embodiment, this step is performed by determining whether statistics for the identified rows using the initial sample size can be adequately scaled upward to extrapolate accurate statistics for the entire table. One approach to accomplishing this is to compare the selected number of rows with a minimum value for the particular statistics for which sampling is performed. For example, consider if the statistic being addressed by the sampling is the "Number of Rows in Table." A minimum value, such as "2500" can be established for this type of statistic. If the identified number of rows from step 202 is less than 2500 rows, then the sample size or sample percentage is increased (208), and steps 202 and 204 are repeated until the minimum sample size is achieved. If the number of rows identified in step 202 meets or exceeds the minimum value, then the sample size is adequate (206).

It is noted that different statistics may require differing tests to determine whether rows sampled during step 202 can be adequately scaled upward to provide statistics for the entire table. The following are additional examples of statistics used for database optimizers: 1) average column length; 2) number of distinct values in column; 3) minimum value in column; and 4) maximum value in column. For the average length, minimum, and maximum statistics, the number of rows sampled during step 202 can be compared to another minimum value, e.g., "919", to determine whether the sample size is adequate.

Figure 4:
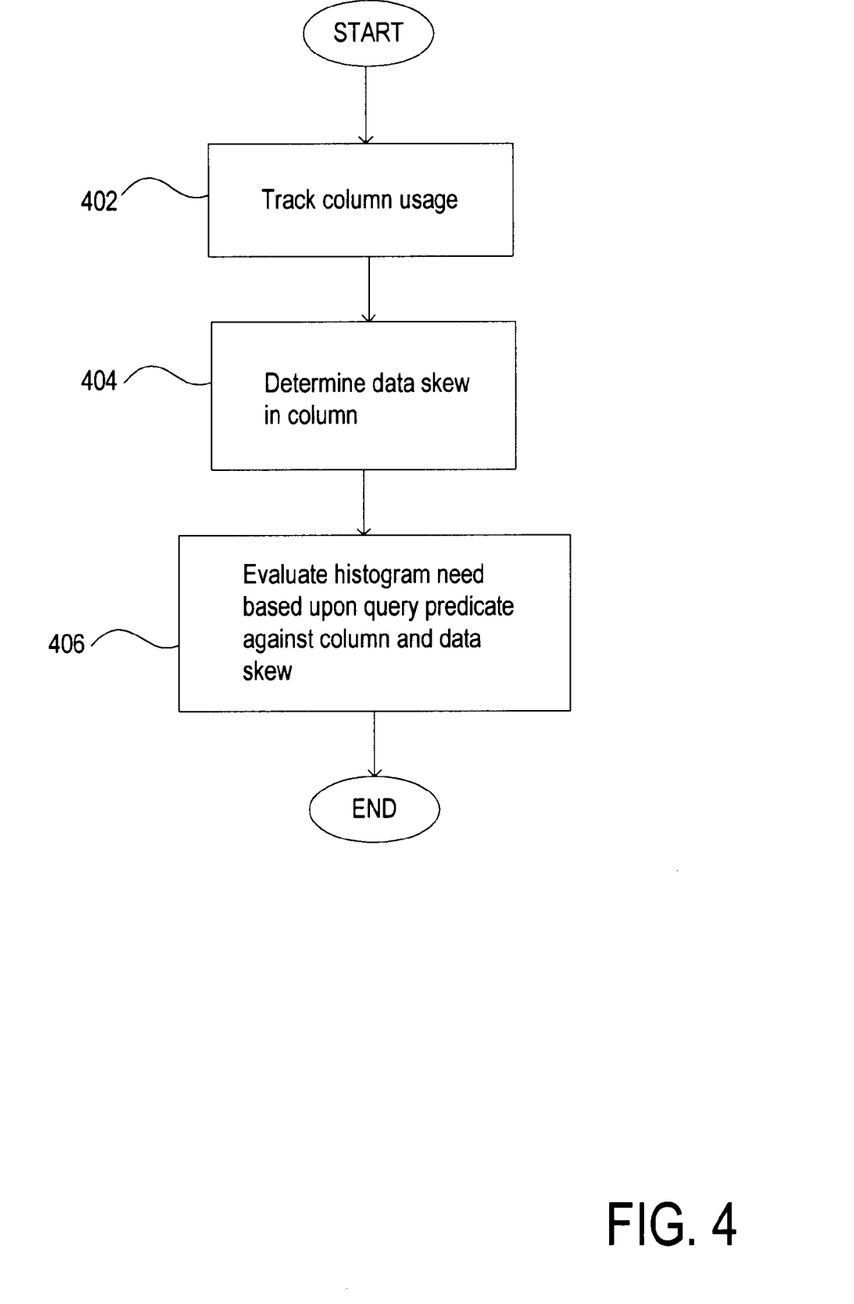
FIG. 4 shows a flowchart of an alternate process for histogram determination according to an embodiment of the invention.

FIG. 4 is a flowchart of a process for determining whether a histogram should be collected or saved according to an embodiment of the invention. At step 402, column usage is tracked during workloads executed against a table. In an embodiment, this is accomplished by marking individual columns while executing queries against those columns. A recordation is made regarding the type of predicate that is evaluated against a column. For example, this type of recordation tracks whether, and how often, an equality, range or like predicate is evaluated against a column. At step 404, a determination is made whether data skew exists for the column values. The predicate type for a particular column and the data skew within that column are analyzed to determine whether a histogram should be collected for the column (406).

In an embodiment, if equality and/or equijoin predicates are evaluated against a column and the column data exhibits non-uniform value repetition, then a histogram should be collected and/or saved for the column. If like or range predicates are evaluated against a column and the column data exhibits non-uniformity in range, then a histogram should be collected and/or saved. The meaning of "non-uniform value repetition" and "non-uniformity in range" is defined below according to one embodiment of the invention.

Figure 3:
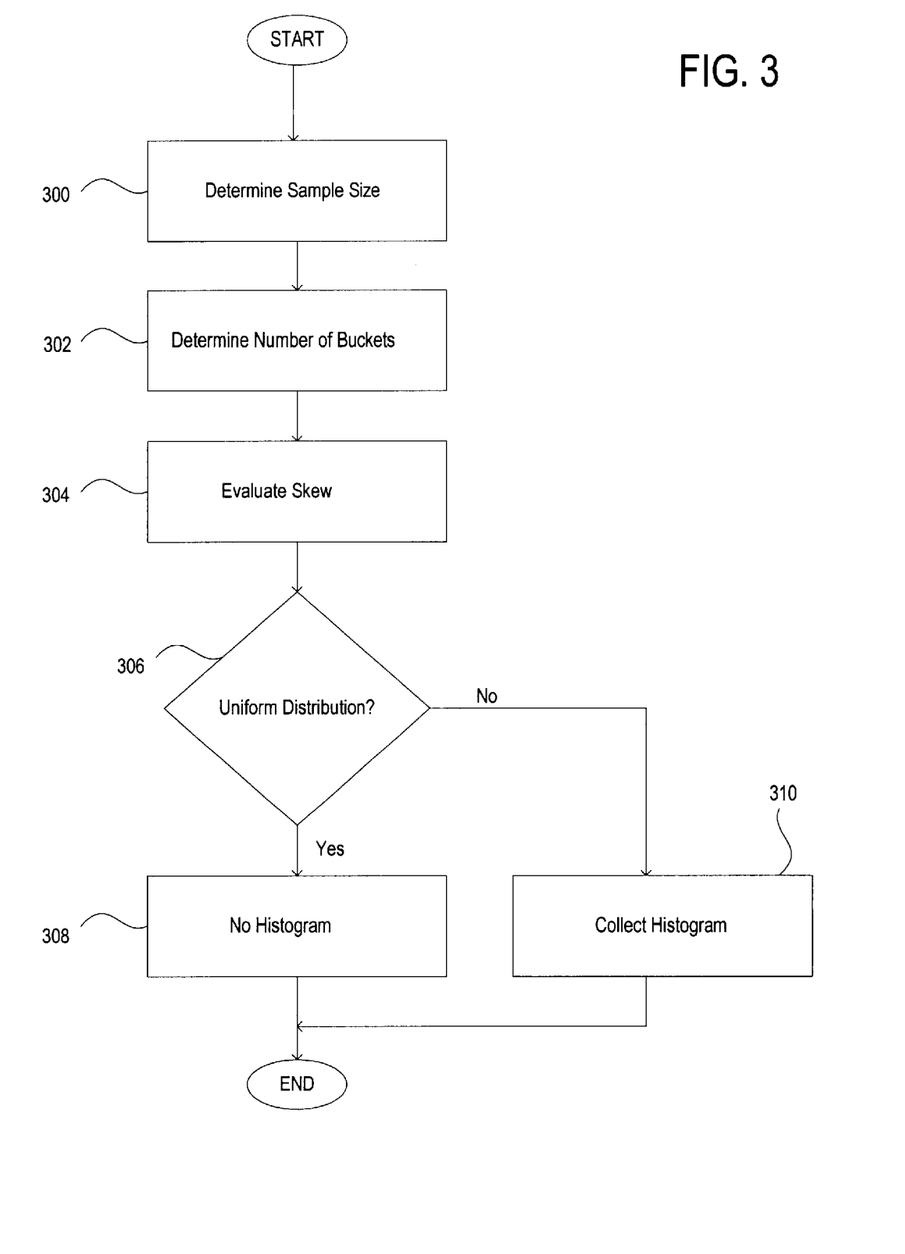
FIG. 3 shows a flowchart of a process for histogram determination according to an embodiment of the invention.

Instead of, or in addition to, the process of FIG. 4, the process shown in FIG. 3 can be used to determine whether a histogram should be collected or saved for a table column. If data sampling is being performed, then a determination is made at step 300 whether the sample size is adequate. If not, then the sampling rate is adjusted upward to collect an adequate sample size. In one embodiment, if the number of non-null column values in the sample is less than 2500, then the sample rate is increased to provide more samples.

At step 302, a determination is made regarding the expected number of buckets for the histogram. At step 304, data uniformity/range skew is evaluated for the data sample values with respect to the expected histogram buckets. In an embodiment, this is accomplished by gathering frequency and histogram information for the column values. For example, a simple query can be executed to collect distinct values and their counts for a column. At step 306, a determination is made whether the column values are uniform. In an embodiment, this determination checks whether any values repeat more than other values in the column, or whether there are any range skews in the data. If so, then the data is non-uniform. If the data is non-uniform, then a histogram is collected for the column (310). If the column data is uniform then the values in the column are considered to be equally distributed; therefore, either no histogram is collected or a previously collected histogram is not saved/used (308).

ILLUSTRATIVE EMBODIMENT

The present section describes pseudocode to implement an illustrative embodiment of the invention. Initially, the illustrative embodiment begins by building an array of columns needing statistics. Then, the illustrative process primes data structure bits that represent which statistics need to be gathered for which columns. The process may re-invoke this procedure when auto-increasing the sample size to re-set the still necessary bits for statistics requiring an increased sample size. The process creates a list of query statements needed to gather all statistics—this "select" list may be reused across all partitions and subpartitions. These queries are executed to gather statistics for every table/partition object requested. Finally, the illustrative procedure sets the gathered statistics in a data dictionary. The sample size used while gathering statistics is automatically adjusted during the procedure to ensure adequate sample size for the particular statistics being collected. The following comprises high-level pseudocode for the illustrative embodiment:

```
if auto sample size
    do a quick row count estimate of the object
    initialize all of the statistics bits for the columns
    while there are still unresolved statistics
        generate the from clause for the query
        execute the basic query
        work on all of the desired histograms
        evaluate the basic statistics
        if some statistics are not ready (need larger sample size)
            construct a new select list using the current statistics
bits
```

The following table defines variables used in the illustrative pseudocode.

TABLE 1

| Term | Definition |
| --- | --- |
| P | Sampling fraction (between 0.0 and 1.0) |
| N | Number of rows in the table |
| Avg | Average column length statistic |
| min/max | Minimum/maximum column value statistic |
| Nv | Number of null column values statistic |
| Ndv | Number of distinct values statistic |
| S | Number of rows seen in the sample |
| Snnv | Number of non-null column values seen in the sample |
| Sndv | Number of distinct values seen in the sample |
| mnb | Maximum number of buckets allowed in the histogram |

The following is pseudocode for the top level routine for gathering statistics and for determining whether a histogram should be collected:

```
estimate n -- use block sample count(*) on user's table
    initialize_gather_bits( )
    while (some statistics still need to be (re)collected)
        generate_from_clause( ) -- includes possible materialization of
        new table
        execute_basic( )
        execute_hist( )
        evaluate_basic( )
```

This top level pseudocode executes the main functions that comprise the statistics gathering processes according to one embodiment of the invention.

The initialize_gather_bits( ) function is a procedure which takes in the array of columns for which statistics need to be collected and sets bits representing which statistics are needed. These bits are later individually cleared after gathering statistics and evaluating their probable accuracy. The function is called initially so that the select list can be generated from it for all objects. It is later called again to reset the bits for each new object (e.g., table/partition/subpartition).

The process takes in the list of columns (including statistics bits) and creates a select list to be used to gather basic statistics (not including histograms). In an embodiment, the process ensures that the select list does not contain more functions than the server can handle at once, e.g., only 256 distinct aggregates. If it cannot fit them all in one statement, the caller is informed of which columns are included.

The generate_from_clause( ) function has the responsibility of generating the FROM clause for the basic query and all the histogram queries. In one embodiment, each histogram uses a separate query, and therefore employs a separate scan of the data. If many scans are required and involve sampling the underlying table, it may be beneficial to materialize the sample once and then pass over that multiple times. If that is the case, this procedure in one embodiment will generate a temporary table and populate it with a sample.

The execute_basic( ) function handles the basic statistics query to parse, execute, and fetch information from the database objects. In an embodiment, the query is generated earlier in the process and the column array provides sufficient information to infer the select list.

The evaluate_basic( ) procedure looks at the fetched basic statistics and tries to scale them up. This procedure clears the bits for all statistics that are acceptably scaled, and suggests a larger sampling percentage if some statistics need to be recollected.

The execute_hist( ) procedure is the driver for collecting and evaluating the histogram statistics. This function looks over all columns that are marked as possibly needing histograms. It then collects a frequency histogram, a height histogram, or both, depending upon the expected number of distinct values and the requested number of buckets.

The following comprises pseudocode for an embodiment of the initialize_gather_bits( ) function, in which the following statistics are collected: nv, ndv, min, max, and avg.

```
for each column the user requested
    mark a bit to indicate need to collect the following statistics:
        nv, ndv, min, max, avg
    if there is a need to collect a histogram (see results of FIG. 4)
        mark a bit indicating this
```

The following comprises pseudocode for an embodiment of the generate_from_clause( ) function, which establishes the initial sampling fraction p for the statistics gathering process:

```
if first time, set p to 5500 / n -- try for 5500 rows
    otherwise, p is passed in to this function
if((p <= 0) or (p >= 0.15)) set p to 1.0 -- don't sample
if p < 1.0 and there are multiple passes (due to histograms)
    materialize the sample in another table and use that table instead
```

In the illustrative embodiment, the process attempts to collect 5500 rows. To accomplish this, it is useful to know in advance the number of rows in the table. Based upon the number of rows, the sampling fraction p is established as shown in the pseudocode. If the number of rows is not known, then estimate this value. Certain thresholds can be established for the sampling fraction, beyond which the sampling fraction is set to 1. Under certain circumstances, it may make sense to create another table to hold the sampled data from the column. For example, if multiple passes are needed, e.g., because histograms are to be collected, then the samples are materialized into a table to prevent repeated accesses to the larger base table.

The execute_basic( ) function builds up one or more queries to retrieve sampled data and calculates the desired statistics (excluding histograms in an embodiment). The one or more queries are then executed to retrieve the results for evaluation, as set forth below. In an embodiment, the one or more queries samples rows from the table based upon the sampling fraction p that was previously established.

The evaluate_basic( ) function determines whether the number of rows sampled according to the sampling fraction p can be adequately scaled upward for the entire table.

The following comprises pseudocode for an embodiment of the evaluate_basic( ) function:

```
if (p < 1.0)
    if (s < 2500) -- too small a sample
        bump up p accordingly
    n = s / p
    for each column
        clear all non-histogram bits that indicate which statistics to
            collect if nv bit was set
            nv = n - snnv / p
        if (avg, min, or max bit was set) and (snnv < 919)
            bump up p accordingly
            set avg, min, and max bits again for next pass
        if ndv bit was set
            try to scale it up *
            if cannot scale upward
                bump up p accordingly
                set ndv again for next pass
else -- this was not an estimate
    set all requested statistics
```

The pseudocode first checks that at least 2500 rows were sampled based upon the current sampling fraction (p). If not, then the sampling fraction is adjusted upward and the table is re-sampled. If a sufficient number of rows has been collected, then the number of rows (n) is estimated based upon the following: n=s/p, where s represents the number of rows that have been collected.

For the average length, minimum, and maximum column value statistics (avg, min, max), the pseudocode checks that at least 919 non-null column values (snnv) are detected in the sample. If so, then these values are considered adequate for the entire table. If not, then the sampling fraction p is increased for the next pass through the table.

For the number of distinct values statistic (ndv), the pseudocode attempts to scale this statistic up for the entire table. If the statistic based upon the sampled rows cannot be scaled upward, then the sampling fraction is increased for the next pass through the table.

The following comprises pseudocode for scaling ndv and density (defined below) statistics according to an embodiment of the invention:

```
sdiv := sndv / snnv
if((snnv < 100) or
    ((snnv >= 100) and (snnv < 500) and (sdiv > 0.3299)) or
        ((snnv >= 500) and (snnv < 1000) and (sdiv > 0.4977)) or
        ((snnv >= 1000) and (snnv < 2000) and (sdiv > 0.5817)) or
        ((snnv >= 2000) and (snnv < 5000) and (sdiv > 0.6634)) or
        ((snnv >= 5000) and (snnv < 10000) and (sdiv > 0.7584)) or
        ((snnv >= 10000) and (snnv < 1000000) and (sdiv > 0.8169)) or
        ((snnv >= 1000000) and (sdiv > 0.9784)))
    cannot reliable use kkesdv to scale the value
```

```
    else
        can use kkesdv scaling reliably
        nnv := snnv / p
if((sndv = snnv) and
    ((snnv >= 29472) or
        ((nnv < 10000) and (snnv >= 708)) or
        ((nnv < 40000) and (snnv >= 1813)) or
        ((nnv < 160000) and (snnv >= 4596)) or
        ((nnv < 640000) and (snnv >= 11664)))) then
        can use linear scaling reliably -- ndv := sndv * 1/p
    else
        cannot reliably use linear scaling to scale the value
```

The following comprises pseudocode for an embodiment of the kkesdr scaling function:

```
    x1 := sndv
    x2 := nnv
    stay_loop := true
    while (stay_loop and (x1 <= x2)
        x := floor ( (x2 + x1)/2)
        y2 := x * (1-power(1-(1/x), snnv))
        if(sndv < y2)
            x2 := x-1
        elseif (sndv > y2)
            x1 := x + 1
        else
            stay_loop := false
    ndv := x
```

The execute_hist( ) function determines whether a histogram should be collected. The following comprises pseudocode for an embodiment of the execute_hist( ) function:

```
for each column with the histogram bit set
    if((p < 1.0) and (snnv < 2500))
        not enough data -- bump up p for next pass accordingly
    else
        if # buckets specified via an integer or repeat
            set mnb to that value
        else
            set mnb to min(75,(max(200, snnv/26)))
        estimate the ndv based on prior information if available
        if(estimated ndv < (mnb * 0.75)) -- probably a frequency
            histogram execute_frequency( )
        if still need to collect histogram
            execute_height( )
```

As before, the pseudocode checks whether 2500 rows have been collected during the sampling process. If not, then the sampling fraction (p) is increased for the next pass through the table. The maximum number of buckets (mnb) is set as shown in the pseudocode. The number of distinct values (ndv) is estimated, possibly based upon a previous pass through the table and the prior execution of the evaluate_basic( ) function.

If it is desired to collect a histogram and the estimated ndv value is below a given threshold (mnb*0.75), then a frequency histogram is generated in an embodiment. A frequency histogram is often appropriate for a column having a small number of distinct values. In a frequency histogram, the endpoints of multiple buckets have the same endpoint value (because the same value entry is in multiple buckets). For this reason, buckets having the same endpoint values often do not need an explicitly expressed endpoint. This provides one or more "bucket gaps" in the histogram that allows comparatively cheap storage and compressed representation of such frequency histograms. If this type of data distribution is identified, then the process preferably creates a frequency histogram using the execute_frequency( ) function. If it is desired to collect a histogram and the ndv value is greater than an established threshold, then the procedure generates a height-balanced histogram using the execute_height( ) function in an embodiment of the invention.

The following comprises pseudocode for an embodiment of the execute_frequency( ) function:

```
build up frequency query and execute it
if (ndv <= mnb) -- have a good frequency histogram
    clear histogram collection bit
```

The following pseudocode can be used to build up a frequency query according to an embodiment of the invention:

```
select c, count(*)
from t sample (s)
where c is not null
group by c
    order by c;
```

This query collects column values from a table and performs a count of the values.

The following comprises pseudocode for an embodiment of the execute_height( ) function:

```
build up a height-balanced query and execute it
check for non-uniformity
if non-uniformity exists
    try to scale the multiplicative inverse of the density
        if it can be successfully scaled -- histogram is ready
            clear histogram collection bit
else
    clear histogram collection bit -- no histogram needed
```

In this pseudocode, the column values are checked for non-uniformity. If the column values are uniform, then no histogram is collected. Otherwise, the pseudocode attempts to scale the multiplicative inverse of the density using the previously described process for scaling ndv. In prior evaluations, the number of repetitions was considered uniform over the values; but once histograms are introduced, the popular values can be removed to remove influence upon non-popular values in the histogram.

According to an embodiment, a popular value is a value that corresponds to more than one endpoint in a height-balanced histogram. All values that are not popular are considered non-popular. Density is the expected number of repeated occurrences of a non-popular value. In one embodiment, density can be calculated as the sum of the square of the repetition counts for non-popular values divided by the product of the number of rows in the table and the number of non-popular values in the table.

The following comprises pseudocode for building up a height-balanced query according to one embodiment of the invention:

```
select maxbkt, min(value) minval, max(value) maxval,
    sum(rep) sumrep, sum(repsq) sumrepsq, max(rep) maxrep, count(*)
bktndv from (
    select value, max(bkt) maxbkt,
        count(value) rep, count(value)* count(value) repsq
    from (
        select c as value, ntile(mnb) over (order by c) bkt
        from t sample(s)
        where c is not null
    )
    group by value;
)
group by maxbkt
order by maxbkt;
```

Here, the inner select statement calls an ntile( ) function, which creates a height-balanced histogram and places data sample values into appropriate buckets in the histogram. In an embodiment, such a function creates an uncompressed histogram and returns a number representing the bucket that a value falls into. The repetition counts (and square of repetition counts) are selected in the middle statement. The outer loop performs a count and checks the values and buckets for the result set. The max and min values for the buckets are reviewed to obtain the histogram endpoints.

Density, which is related to the selectivity of non-popular values in the data sample, is calculated in this procedure using the function results from the outer loop. This is computed in an embodiment by looking at the number of repetitions of a non-popular value.

The result of this query is that one row is obtained per bucket, with missing buckets coming from the more popular values. Each row will have the minimum and maximum value for that bucket, along with the number of rows in that bucket, the sum of the repetition counts and square of the repetition counts for rows in that bucket, and the number of repetitions for the most popular value in that bucket. All missing buckets have been folded into the nearest bucket that is larger.

For example, consider if the process ends up with the following:

| maxbkt | minval | maxval | sumrep | sumrepsq | maxrep |
|--------|--------|--------|--------|----------|--------|
| 1      | 1      | 2      | 2      | 2        | 1      |
| 4      | 3      | 4      | 9      | 65       | 8      |
| 5      | 5      | 5      | 3      | 9        | 3      |
| 6      | 6      | 8      | 4      | 6        | 2      |
| 8      | 9      | 10     | 6      | 20       | 4      |

This would mean that the number 3 is popular because it is the largest value in the missing buckets 2 and 3. Notice that the number 9 is not a popular value because it is only the largest value of a single bucket, bucket 7, and thus would only appear once as a histogram endpoint. To calculate density, the influence of the popular value, 3, would be removed. Since the value 3 appears 8 times, the number 8 is subtracted from the sumrep sum and 64 (square of 8) from the sumrepsq sum. This enables the computation at a density which is based upon the number of rows in the table, the number of non-popular values in the column, and the sum of the square of the repetition counts of non-popular values.

The following pseudocode provides an illustrative embodiment of the invention for histogram determination that was generally described with respect to FIG. 4.

```
for each column, c, for which a histogram is considered
    if the user has specified size
        create and save a histogram with number of buckets = requested
            size
    else if the user has specified size repeat
        if c already has a histogram with b buckets
            create and save a histogram with b buckets
    else if the user has specified size skewonly
        create a histogram
            if the created histogram exhibits equality or range skew
                save it in the dictionary
    else if the user has specified size auto
        check the dictionary for column usage information
        if c has been in a predicate involving an equality, range, or like
            create a histogram
            if c appeared in an equality (including equijoin) predicate
                if the histogram exhibits non-uniformity in value
                    repetition save it in the dictionary
            if c appeared in a like or range predicate (not involving
                join)
                if the histogram exhibits non-uniformity in range
                    save it in the dictionary
        any prior histogram on c will be removed
```

The first portion of the pseudocode relates to specific instructions from a user to create a histogram, which results in the creation of the desired histogram. The specific histogram is created without a determination as to whether it is actually needed. Alternatively, the invention can be adapted to automatically check whether a histogram specifically called for by a user should actually be collected and/or saved.

The second portion of the pseudocode relates to automated determination of histogram collection. In this illustrative embodiment, the following items of information are utilized for histogram determination: 1) the subset of columns for which the user wants to gather statistics; 2) the columns which already have histograms created for them; 3) column usage information; and 4) the distribution of data, e.g., as seen in a data sample. Because data distribution information is involved, this process may be advantageously used in conjunction with the process of FIG. 2 for automated sample size determination.

In the illustrative embodiment, column usage information is considered in conjunction with data distribution information for that column to determine whether a histogram should be collected and stored. Column usage information includes, for example, the type of predicates that is executed against the column. The data skew of the column is evaluated against the type of predicate for that column to determine whether a histogram is needed.

When parsing a statement for the first time in an embodiment, the cost-based optimizer looks at the statistics on all of the objects (tables, columns, etc.) involved in the statement. For each column in the where clause, it will estimate the selectivity of the predicate involving that column. At this point, the system will make an entry in the data structure for the column indicating what type of predicate it was involved in.

In an embodiment, column usage information is collected every time a user hard-parses a statement, in which a bit is marked in memory for the column usage information. Whenever information is flushed to disk, these bits indicate whether to increment the appropriate dictionary columns. For example, if a query containing a column with a range predicate was hard parsed since the last flush, the system will increment the range_predicate counter for that column when the next flush procedure takes place, as well as updating the timestamp. One reason for using counters on disk is to provide a better feel for the importance of the predicate. Counters can also be used in memory, but may result in expensive overhead.

In the illustrative pseudocode, a histogram is created if the column is involved in equality, range, or like predicates. In an embodiment, the histogram is created based on a sampled portion of the column, and is preferably created using a small sample of the entire population that is sufficient to both determine the need for histograms and produce histograms which are representative of the entire population. The number of buckets in the histogram could be based on the sample size. The range max and min is selected based upon the data samples. Values in the data samples are placed into the selected buckets. The process then counts the number of equi-height endpoints that fall within the equi-width buckets. The buckets are reviewed to determine if any buckets are overly large or small. If so, then it is likely that the column does not have uniform data distribution, thereby indicating range skew. In addition, the act of creating a histogram also provides an estimate for the number of distinct values, providing an extra benefit even if the histogram is later discarded.

If an equality or equijoin predicate is involved, then the histogram is saved only if the histogram exhibits non-uniformity in value repetition. For purposes of this example, a column will be considered to have non-uniform value repetition if any value is popular, e.g., repeats as an endpoint in the histogram.

If a like or range predicate is involved, then the histogram is saved only if the histogram exhibits non-uniformity in range. In one embodiment, a column is considered to have non-uniformity in range if it passes the following test:

```
given that the created histogram had b equi-height buckets
divide the range (max–min) into b equi-width buckets
sum = 0
for each equiwidth bucket
    count the number of equi-height endpoints that fall in the bucket
    sum += (count * count)
if(sum / b)>1.7
    this column is considered to be non-uniform in range
```

For a uniform column, the equi-height endpoints would coincide with the equi-width endpoints, and the sum would simply be b.

SYSTEM ARCHITECTURE OVERVIEW

Figure 5:
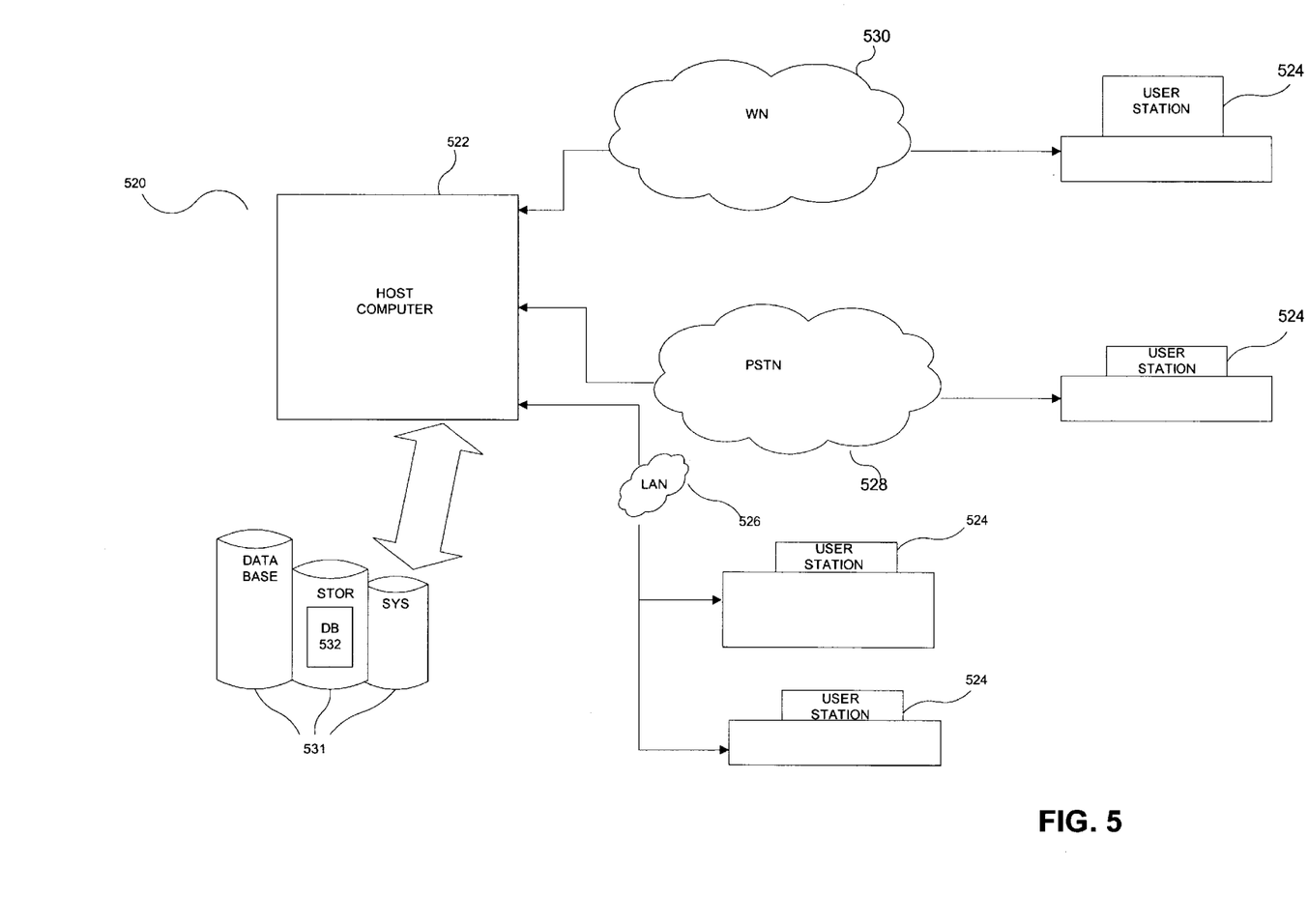
FIGS. 5 and 6 are diagrams of system architectures with which the present invention may be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522. Note that a multiple tier architecture can be employed to connect user stations 524 to a database 532, utilizing for example, a middle application tier (not shown). In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 522 can access two or more databases 532, stored in a variety of mediums, as previously discussed.

Figure 6:
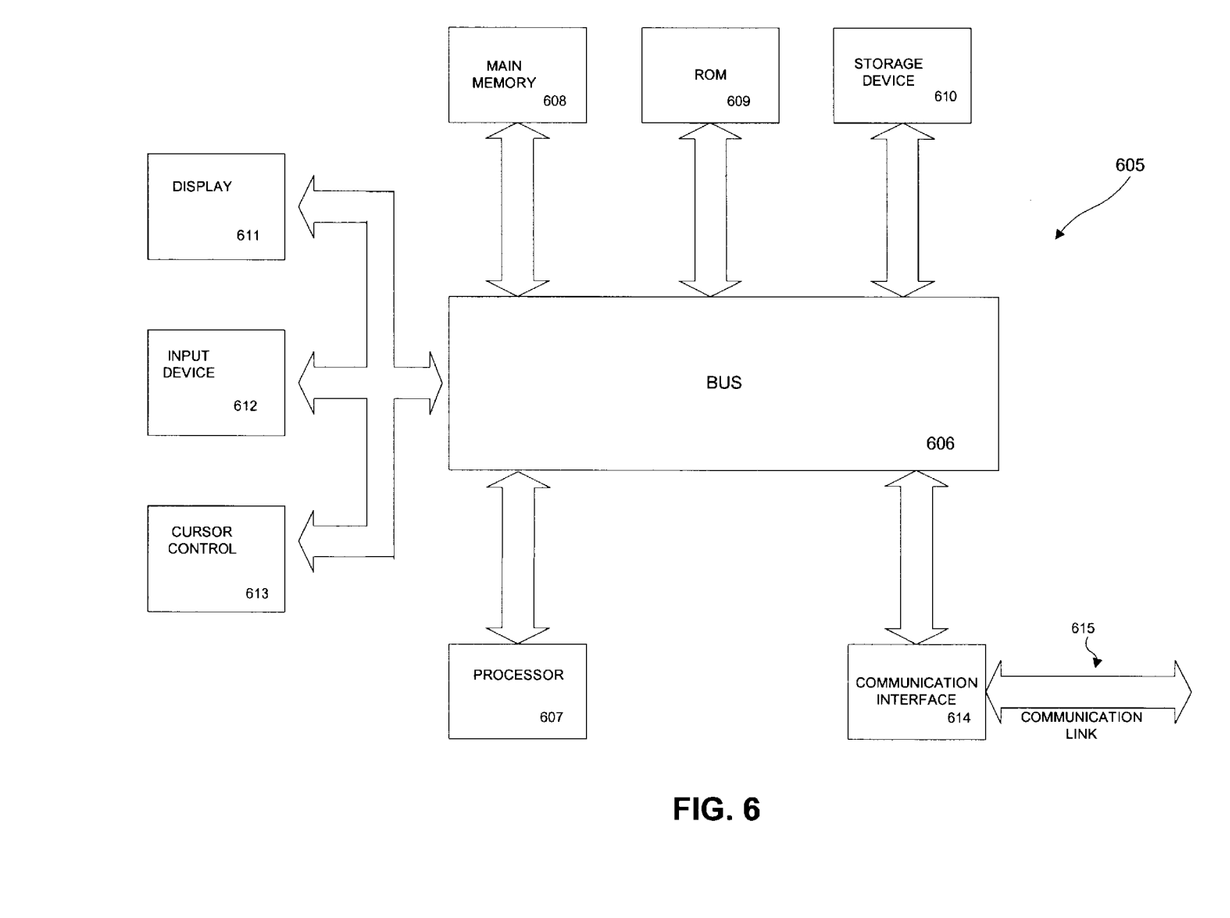

Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607. A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other columns, is coupled to the bus 606 for communicating information and command selections to the processor(s) 607. Another type of user input device may include a cursor control 613, such as, but not limited to, a mouse, a trackball, a fingerpad, or cursor direction columns, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information. Various forms of computer-usable media may be involved in providing one or more sequences of one or more instructions to the processor(s) 607 for execution. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 624 and the host computer 622. The communication interface 614 of a respective processing unit transmits and receives electrical, electromagnetic or optical signals that include data streams representing various types of information, including instructions, messages and data. A communication link 615 links a respective user station 624 and a host computer 622. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

What is claimed is:

1. A method for determining sample size for statistics collection in a database system, comprising:
    a. selecting a sample size to determine a first set of statistics for a data population, the first set of statistics comprising a first statistic;
    b. identifying data samples from the data population corresponding to the initial sample size;
    c. making a determination of adequacy for the data samples for the first statistic, wherein determination of adequacy comprises determining whether the sample size includes at least 919 rows;
    d. if the data samples are not adequate, then increasing the sample size and repeating steps b and c; and
    e. if the data samples are adequate, then storing the first statistic which was generated based upon the data samples.

2. The method of claim 1 in which the first statistic comprises the number of rows in a database table.

3. The method of claim 1 in which the first statistic comprises average column length.

4. The method of claim 1 in which the first statistic comprises maximum value.

5. The method of claim 1 in which the first statistic comprises minimum value.

6. The method of claim 1 in which the sample size is expressed as a sampling fraction of the population.

7. The method of claim 6 in which the sampling fraction is independently evaluated against each individual row in a database column or table.

8. The method claim 1 further comprising the step of generating the first statistic based upon the data samples.

9. The method of claim 1 in which step c further comprises determining if generated statistics based upon the data samples can be scaled for the entire population.

10. The method of claim 1 in which step c further comprises comparing a threshold value against the number of rows in the data samples.

11. The method of claim 1 in which the data samples are stored in a separate database object.

12. The method of claim 11 in which a re-scan is performed against the separate database object.

13. The method of claim 1 in which the first statistic comprises a histogram.

14. The method of claim 1 in which the sample size is selected to attempt retrieval of at least 5500 rows of a database table or column.

15. The method of claim 1 in which the first statistic comprises a number of distinct values.

16. The method of claim 15 in which step c further comprises determining if the first statistic based upon the data samples can be scaled based upon evaluating the number of distinct values and the number of non-null values in the data samples.

17. The method of claim 1 in which the set of statistics further comprises a second statistic, in which the first statistic generated based upon the sample size is adequate but the second statistic generated based upon the sample size is inadequate and for which the sample size is increased to identify additional data samples for the second statistic.

18. A method for determining sample size for statistics collection in a database system, the method comprising:
    (a) generating a statistic for a data population using a sample of data values from the data population, the sample of data values having a sample size;
    (b) determining whether the sample size is adequate for the statistic without obtaining an additional sample;
    (c) increasing the sample size and repeating (a) and (b) when the sample size is not adequate for the statistic; and
    (d) storing the statistic when the sample size is adequate for the statistic.

19. The method of claim 18, wherein the statistic comprises average column length, maximum value, minimum value, a histogram, or a number of distinct values.

20. The method of claim 19, wherein (b) comprises evaluating the number of distinct values and the number of non-null values in the sample.

21. The method of claim 18, wherein (b) comprises determining whether the sample size includes at least 919 rows.

22. The method of claim 18, wherein (b) comprises determining whether the statistic can be extrapolated to the data population as a whole.

23. The method of claim 18, wherein (b) comprises comparing a threshold value against the sample size.

24. The method of claim 18, wherein the sample size is expressed as a sampling fraction of the data population.

25. The method of claim 24, wherein the sample fraction is independently evaluated against each individual row in a database column or table.

26. The method of claim 18, wherein the method further comprises:
   (e) generating another statistic for the data population using the sample of data values from the data population;
   (f) determining whether the sample size is adequate for the other statistic;
   (g) increasing the sample size and repeating (e) and (f) when the sample size is not adequate for the other statistic; and
   (h) storing the other statistic when the sample size is adequate for the other statistic.

27. A computer program product that includes a computer-readable medium comprising a sequence of instructions which, when executed by a processor, causes said processor to execute a process for determining sample size for statistics collection in a database system, said process comprising:
   a. selecting a sample size to determine a first set of statistics for a data population, the first set of statistics comprising a first statistic;
   b. identifying data samples from the data population corresponding to the initial sample size;
   c. making a determination of adequacy for the data samples for the first statistic, wherein determination of adequacy comprises determining whether the sample size includes at least 919 rows;
   d. if the data samples are not adequate, then increasing the sample size and repeating steps b and c; and
   e. if the data samples are adequate, then storing the first statistic which was generated based upon the data samples.

28. The computer program product of claim 27 in which the first statistic comprises the number of rows in a database table.

29. The computer program product of claim 27 in which the first statistic comprises average column length.

30. The computer program product of claim 27 in which the first statistic comprises maximum value.

31. The computer program product of claim 27 in which the first statistic comprises minimum value.

32. The computer program product of claim 27 in which the sample size is expressed as a sampling fraction of the population.

33. The computer program product of claim 27, wherein said process further comprises generating the first statistic based upon the data samples.

34. The computer program product of claim 27 in which the first statistic comprises a number of distinct values.

35. The computer program product of claim 27 in which the set of statistics further comprises a second statistic, in which the first statistic generated based upon the sample size is adequate but the second statistic generated based upon the sample size is inadequate and for which the sample size is increased to identify additional data samples for the second statistic.

36. The computer program product of claim 27 in which step c further comprises determining if generated statistics based upon the data samples can be scaled for the entire population.

37. The computer program product of claim 27 in which step c further comprises comparing a threshold value against the number of rows in the data samples.

38. The computer program product of claim 27 in which the first statistic comprises a histogram.

39. The computer program product of claim 34 in which step c further comprises determining if the first statistic based upon the data samples can be scaled based upon evaluating the number of distinct values and the number of non-null values in the data samples.

40. A computer program product that includes a computer-readable medium comprising a sequence of instructions which, when executed by a processor, causes the processor to execute a process for determining sample size for statistics collection in a database system, the process comprising:
   (a) generating a statistic for a data population using a sample of data values from the data population, the sample of data values having a sample size;
   (b) determining whether the sample size is adequate for the statistic without obtaining an additional sample;
   (c) increasing the sample size and repeating (a) and (b) when the sample size is not adequate for the statistic; and
   (d) storing the statistic when the sample size is adequate for the statistic.

41. The computer program product of claim 40, wherein the statistic comprises average column length, maximum value, minimum value, a histogram, or a number of distinct values.

42. The computer program product of claim 41, wherein (b) comprises evaluating the number of distinct values and the number of non-null values in the sample.

43. The computer program product of claim 40, wherein (b) comprises determining whether the sample size includes at least 919 rows.

44. The computer program product of claim 40, wherein (b) comprises determining whether the statistic can be extrapolated to the data population as a whole.

45. The computer program product of claim 40, wherein (b) comprises comparing a threshold value against the sample size.

46. The computer program product of claim 40, wherein the sample size is expressed as a sampling fraction of the data population.

47. The computer program product of claim 46, wherein the sample fraction is independently evaluated against each individual row in a database column or table.

48. The computer program product of claim 40, wherein the process further comprises:
   (e) generating another statistic for the data population using the sample of data values from the data population;
   (f) determining whether the sample size is adequate for the other statistic;
   (g) increasing the sample size and repeating (e) and (f) when the sample size is not adequate for the other statistic; and
   (h) storing the other statistic when the sample size is adequate for the other statistic.

49. A system for determining sample size for statistics collection in a database system, comprising:
   a. means for selecting a sample size to determine a first set of statistics for a data population, the first set of statistics comprising a first statistic;
   b. means for identifying data samples from the data population corresponding to the initial sample size;
   c. means for making a determination of adequacy for the data samples for the first statistic, wherein determination of adequacy comprises means for determining whether the sample size includes at least 919 rows;

d. means for increasing the sample size and repeating steps b and c when the data samples are not adequate; and e. means for storing the first statistic which was generated based upon the data samples when the data samples are adequate.

50. The system of claim 49 in which the first statistic comprises the number of rows in a database table.

51. The system of claim 49 in which the first statistic comprises average column length.

52. The system of claim 49 in which the first statistic comprises maximum value.

53. The system of claim 49 in which the first statistic comprises minimum value.

54. The system of claim 49 in which the sample size is expressed as a sampling fraction of the population.

55. The system of claim 49 further comprising means for generating the first statistic based upon the data samples.

56. The system of claim 49 in which the first statistic comprises a number of distinct values.

57. The system of claim 49 in which the set of statistics further comprises a second statistic, in which the first statistic generated based upon the sample size is adequate but the second statistic generated based upon the sample size is inadequate and for which the sample size is increased to identify additional data samples for the second statistic.

58. The system of claim 49 in which step c further comprises means for determining if generated statistics based upon the data samples can be scaled for the entire population.

59. The system of claim 49 in which step c further comprises means for comparing a threshold value against the number of rows in the data samples.

60. The system of claim 56 in which the first statistic comprises a histogram.

61. The system of claim 56 in which step c further comprises means for determining if the first statistic based upon the data samples can be scaled based upon evaluating the number of distinct values and the number of non-null values in the data samples.

62. A system for determining sample size for statistics collection in a database system, the system comprising:

(a) means for generating a statistic for a data population using a sample of data values from the data population, the sample of data values having a sample size;

(b) means for determining whether the sample size is adequate for the statistic without obtaining an additional sample;

(c) means for increasing the sample size and repeating (a) and (b) when the sample size is not adequate for the statistic; and (d) means for storing the statistic when the sample size is adequate for the statistic.

63. The system of claim 62, wherein the statistic comprises average column length, maximum value, minimum value, a histogram, or a number of distinct values.

64. The system of claim 63, wherein (b) comprises means for evaluating the number of distinct values and the number of non-null values in the sample.

65. The system of claim 62, wherein (b) comprises means for determining whether the sample size includes at least 919 rows.

66. The system of claim 62, wherein (b) comprises mean for determining whether the statistic can be extrapolated to the data population as a whole.

67. The system of claim 62, wherein (b) comprises means for comparing a threshold value against the sample size.

68. The system of claim 62, wherein the sample size is expressed as a sampling fraction of the data population.

69. The system of claim 68, wherein the sample fraction is independently evaluated against each individual row in a database column or table.

70. The system of claim 62, wherein the system further comprises:

(e) means for generating another statistic for the data population using the sample of data values from the data population;

(f) means for determining whether the sample size is adequate for the other statistic;

(g) means for increasing the sample size and repeating (e) and (f) when the sample size is not adequate for the other statistic; and (h) means for storing the other statistic when the sample size is adequate for the other statistic.

* * * * *